(12) United States Patent
Ambareesh et al.

(10) Patent No.: US 10,623,370 B1
(45) Date of Patent: Apr. 14, 2020

(54) SECURE DATA FLOW FOR VIRTUAL WORKSPACES

(71) Applicant: Amazon Technologies, Inc., Reno, NV (US)

(72) Inventors: Gopala Krishna Ambareesh, Bellevue, WA (US); James Henry Baker, III, Redmond, WA (US); Hakimuddin Hanif, Redmond, WA (US); Malcolm Russell Ah Kun, Kirkland, WA (US); Prasanna Subash, Kenmore, CA (US); Nathan Bartholomew Thomas, Bellevue, WA (US); Divij Vaidya, Seattle, WA (US); Varun Verma, Newcastle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 334 days.

(21) Appl. No.: 15/474,558

(22) Filed: Mar. 30, 2017

(51) Int. Cl.
| H04L 29/06 | (2006.01) |
| H04L 9/50 | (2006.01) |
| H04L 12/66 | (2006.01) |
| H04L 29/12 | (2006.01) |
| H04L 29/08 | (2006.01) |

(52) U.S. Cl.
CPC ........ *H04L 63/0209* (2013.01); *G06F 9/5077* (2013.01); *H04L 12/66* (2013.01); *H04L 61/2007* (2013.01); *H04L 63/0428* (2013.01); *H04L 67/10* (2013.01)

(58) Field of Classification Search
CPC ............. H04L 63/0209; H04L 61/2007; H04L 63/0428; H04L 12/66; H04L 67/10; G06F 9/5077
USPC .......................................................... 726/12
See application file for complete search history.

(56) References Cited

U.S. PATENT DOCUMENTS

| 2014/0013000 A1* | 1/2014 | Vainer .................... G06Q 50/01 709/229 |
| 2015/0058967 A1* | 2/2015 | Ringdahl ............ H04L 63/0254 726/11 |
| 2015/0339136 A1* | 11/2015 | Suryanarayanan ..... G06F 9/455 718/1 |

* cited by examiner

*Primary Examiner* — Kambiz Zand
*Assistant Examiner* — Aubrey H Wyszynski
(74) *Attorney, Agent, or Firm* — Hogan Lovells US, LLP

(57) ABSTRACT

Virtual workspaces can be provided using shared resources and network-attached storage. A workspace client can access a virtual workspace created under a customer account. For specific types of data, such as pixel data used to render the display component of the workspace on the workspace client, the data can be prevented from being transmitted over a public network. Private security gateway interfaces can be created in the customer environment that can be attached to respective security gateways in the workspace environment. Routing rules are configured such that pixel data for a workspace is only transmitted to the workspace client through a security gateway and over a secure connection to the corresponding private gateway interface in the customer environment, which can direct the pixel data to the workspace client.

20 Claims, 6 Drawing Sheets

SECURE DATA FLOW FOR VIRTUAL WORKSPACES

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In some systems users are able to remotely access private workspaces, or virtual desktops, that are provided using these resources. While the data for these workspaces can be encrypted, the data is often transmitted over a public network. An entity obtaining unauthorized access to the encryption key can then potentially gain access to the data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to managing data in a network environment. In particular, various embodiments provide for the secure streaming of pixel data for virtual workspaces. Virtual workspaces can be provided using shared resources of a workspace environment that are allocated as appropriate, as may include virtual machines and block-based storage volumes. A workspace client used to access the virtual workspace can be located in a customer environment that includes various customer resources. In some embodiments at least some of the workspace data can be transmitted between the workspace client and the virtual workspace over a public network. For specific types of data, such as pixel data used to render the display component of the workspace on the workspace client, the data can be prevented from being transmitted over a public network. In at least some embodiments one or more private security gateway interfaces can be created in the customer environment that can be attached to respective security gateways in the workspace environment. Routing rules can be configured such that pixel data for a workspace is only transmitted to the workspace client by directing the pixel traffic through a security gateway and over a secure socket or connection to the private security gateway in the customer environment, which can direct the pixel data to the workspace client. Thus, in addition to the pixel data being encrypted such a process can provide additional security by preventing the pixel data from being transmitted over a public network.

Various other such functions can be used as well within the scope of the various embodiments as would be apparent to one of ordinary skill in the art in light of the teachings and suggestions contained herein.

Figure 1:
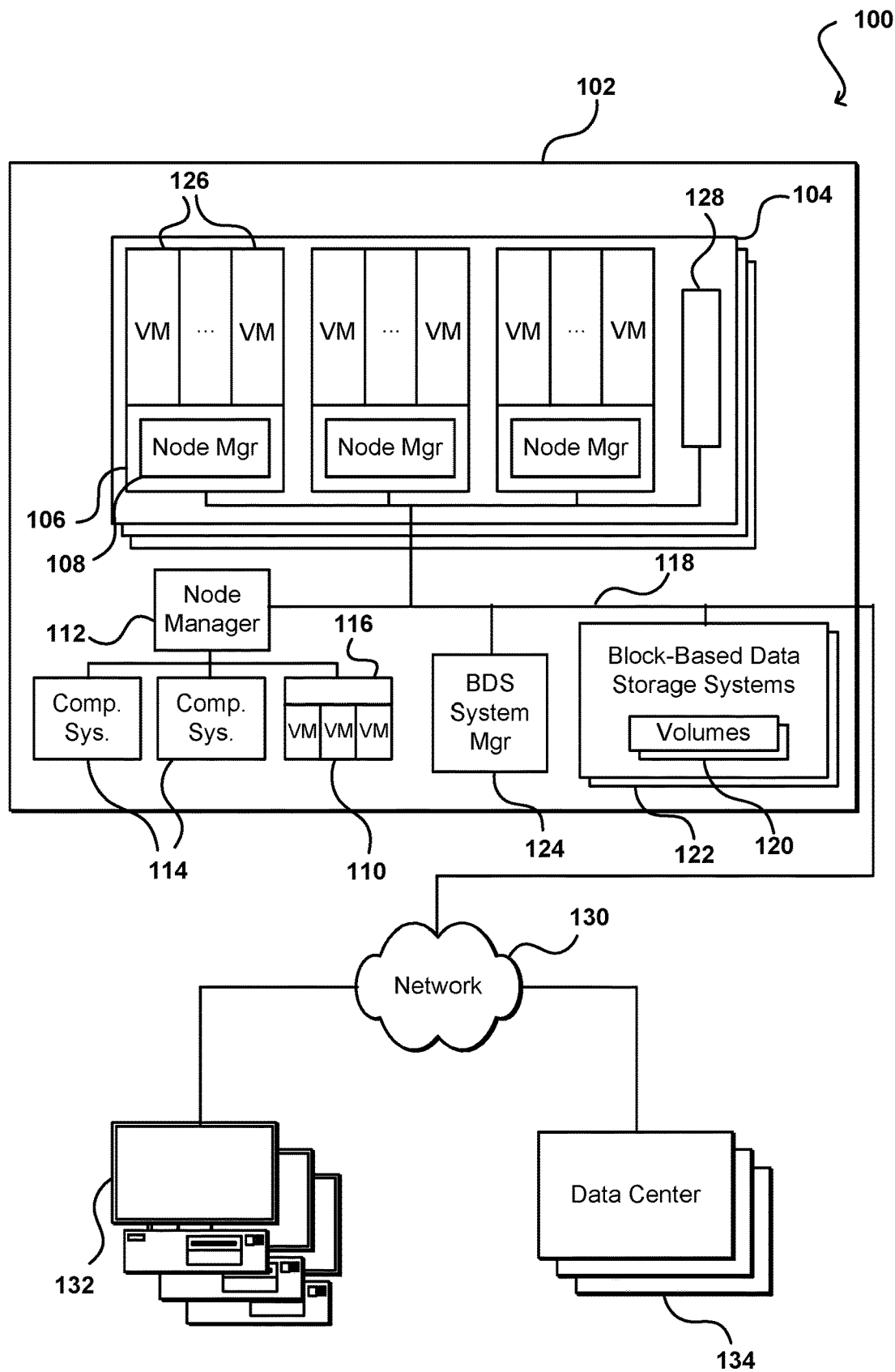
FIG. 1 illustrates an example environment in which aspects of the various embodiments can be implemented.

FIG. 1 illustrates an example network configuration 100 in which computing and data access operations can be performed, along with other such functionality, in accordance with various embodiments. This configuration can include components offered as part of a multi-tenant environment, or resource provider environment 102, wherein the components are provided by a resource provider, and customers pay for access and/or utilization of respective portions of those resources. In this example configuration, the resource provider environment includes a number of racks 104, each rack including a number of host computing devices 106. The host computing systems 106 each host one or more virtual machines. Each virtual machine can act as an independent resource node for executing one or more program copies or performing another such action or process for user data requests, I/O operations, etc. This example configuration also includes computer systems that execute a block-based data storage system or service. The service can utilize a pool of multiple block-based data storage systems, which each have local block-based storage for use in storing one or more volumes 110. Access to the volume copies 110 is provided over an internal network to programs executing on various resource nodes. Thus, an application executing on a virtual machine instance on one of the computer systems 106 can be connected with one or more storage volumes 110 in the block based data storage systems. This is referred to herein as the instance being "attached" to the storage volume(s). In this example configuration, multiple computing systems are operable to execute various programs, applications, and/or services, and further operable to access reliable block-based data storage, such as under the control of a block-based data storage service. A block-based data storage service can use multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 102 includes a number of racks 104, each rack including a number of host computing devices 106, as well as an optional rack support computing system 128 in this example embodiment. The host computing systems 106 on the illustrated rack 104 each host one or more virtual machines 126 in this example, as well as a distinct node manager module 112 associated with the virtual machines on that host computing system to manage those virtual machines. One or more other host computing systems 116 may also each host one or more virtual machines 110 in this example. Each virtual machine 110 may act as an independent resource node for executing one or more program copies or performing another such action or process for user data requests, I/O operations, etc. In addition, this example data center 102 further includes additional host computing systems 114 that do not include distinct virtual machines, but may nonetheless each act as a resource node for one or more tasks being executed for a user. In this example, a node manager module 112 executing on a computing system (not shown) distinct from the host computing systems 114 and 116 is associated with those host computing systems to manage the resource nodes provided by those host computing systems, such as in a manner similar to the node manager modules 108 for the host computing systems 106. The rack support computing system 128 may provide various utility services for other computing systems local to its rack 104 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 102 also includes a computing system 124 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 134, or other remote computing systems 132 external to the data center). In particular, in this example the data center 102 includes a pool of multiple block-based data storage systems 122, which each have local block-based storage for use in storing one or more volume copies 120. Access to the volume copies 120 is provided over the internal network(s) 118 to programs executing on various resource nodes 110 and 114. As discussed in greater detail elsewhere, a block-based data storage system manager module 124 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 122 may coordinate with the node manager modules 112, 108 to manage use of volumes by programs executing on associated resource nodes, while in other embodiments the node manager modules may not be used to manage such volume use. In addition, in other embodiments, one or more BDS system manager modules 124 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 122 (e.g., in a peer-to-peer manner, without any separate centralized BDS system manager module on a computing system 124).

In this example, the various host computing systems, server block data storage systems, and computing systems are interconnected via one or more internal networks 118 of the data center, which may include various networking devices (e.g., routers, switches, gateways, etc.) that are not shown. In addition, the internal networks 118 are connected to an external network 130 (e.g., the Internet or another public data network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 134 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the block-based storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 1 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 1, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume may not be able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

As mentioned, resources such as virtual machine instances can be allocated as needed to provide various user functionality. This can include, for example, the providing of virtual desktops or other types of virtual workspaces that can be accessed by one or more authorized users having the appropriate credentials to access a given workspace. A workspace as used herein can refer to a desktop computing service offered to customers across a network, such as the internet, using resources of a multi-tenant environment. Such workspaces, such as those offered as part of the Amazon Web Services (AWS) suite of services, can enable users to access, store, and work with documents, applications, and computing resources from various devices located at various possible locations. In conventional approaches, a customer having an account under which the workspace is allocated would have to manage the keys for the various users and workspaces. In many instances, keys or other access credentials would be shared across workspace instances for ease of management and other such purposes. The reuse of these keys exposes the data and resources to unauthorized access, however, as a compromised credential can be used to access a workspace or other offering accessible using that credential.

Accordingly, approaches in accordance with various embodiments can manage the encryption of all workspaces for a customer account, as well as the data volumes supporting those workspaces, without interaction with the customer. In at least some embodiments, the encryption may be performed automatically such that the customer may not even be aware that the various volumes are being encrypted. A master key can be maintained for a specific customer using a key management service or other trusted source. The master key can be used to generate security credentials, such as data encryption keys, that can be used to encrypt the volume data travelling across a network between a customer workspace instance and a network-attached storage volume used for the workspace. The encryption in such an approach can be performed in a way that is transparent to the underlying operating system. Even though the key is managed by the key management service, the key will still be owned by the customer and not the workspace service or workspace manager. Such an approach can prevent the service from being able to accidentally share an encrypted snapshot or other data object with another customer or entity.

Figure 2:
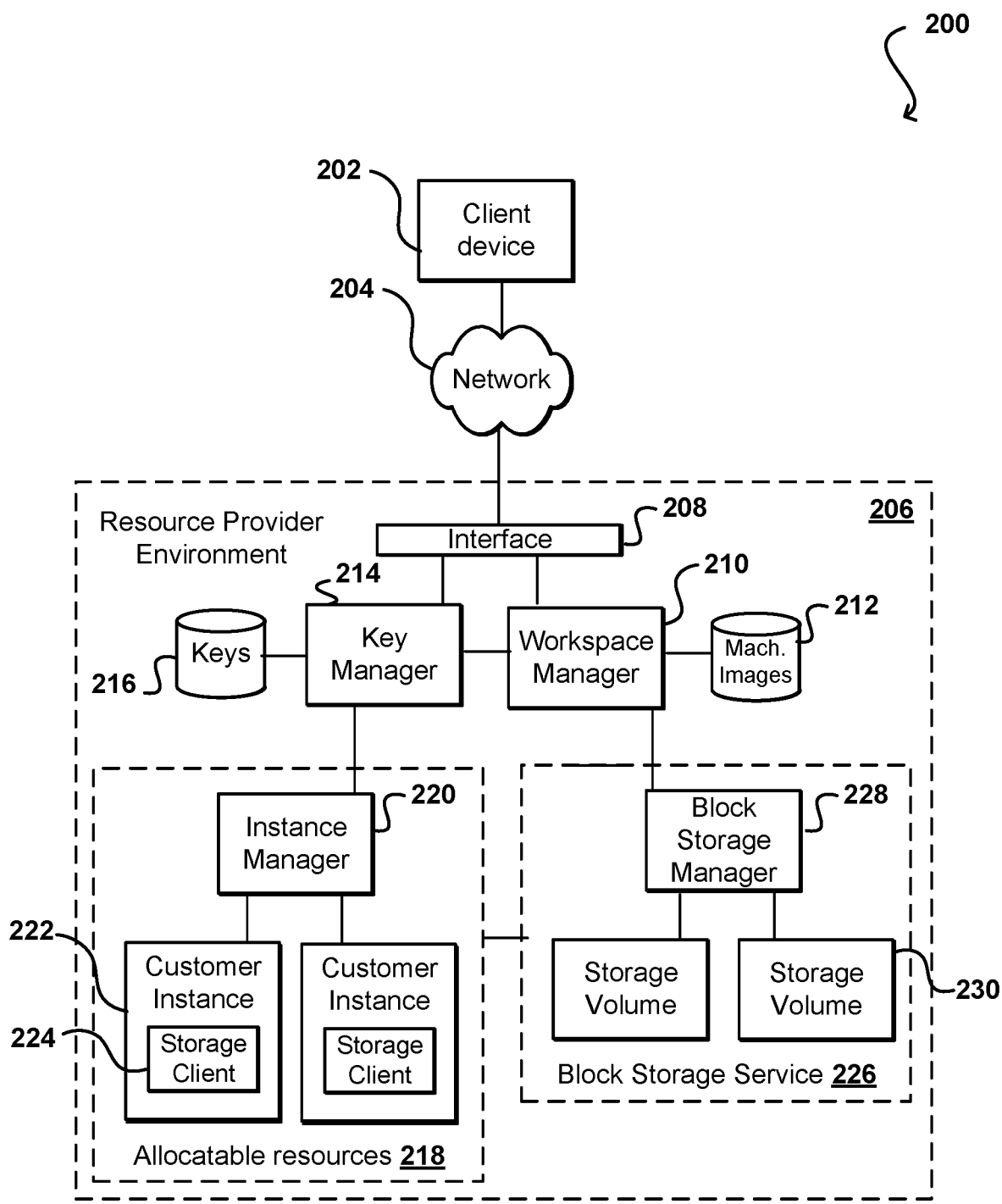
FIG. 2 illustrates components of an example workspace management service that can be utilized in accordance with various embodiments.

FIG. 2 illustrates an example workspace environment 200 that can be implemented in accordance with various embodiments. In this example, a user wanting to access a workspace can utilize a client device 202 to submit a request (via a console or API) over at least one network 204 to be received to an interface layer 208 of a resource provider environment 206, service provider environment, or other shared-resource or multi-tenant environment as discussed herein. Information for the request can be directed to a workspace manager 210 which can manage workspaces for various customers having accounts with the resource provider. The workspace manager can work with an instance manager 220, or resource manager or node manager as discussed elsewhere herein, to cause a customer instance 222, such as a virtual machine instance, to be allocated to support the workspace. This can include, for example, obtaining a machine image from a machine image repository 212 to use to provision the instance with, for example, the appropriate operating system, etc. The workspace manager 210 in this example can also work, directly or indirectly, with a block storage manager 228 of a block storage service 226 to allocate a storage volume 230 to be used to store data for the allocated workspace. A storage client 224 executing as part of the workspace on the customer instance 222 can cause data to be transmitted between the customer instance 222 and the corresponding storage volume 230. Although a block storage service 226 is discussed in this example, it should be understood that various other types of storage can be utilized as well within the scope of the various embodiments. In various embodiments the data storage volume 230, and data transmitted between the storage client 224 and storage volume 230, can be encrypted by default as part of the workspace service. In other embodiments a customer or other entity may select whether or not to perform such encryption. Upon setting up a workspace account or service for a specific customer, a key manager 214 or other key management service can generate a master key specific to that customer, that can be stored to a master key data store 216 or other such location. In this example the customer master key is never exported or available outside the key management service. The master key will be maintained by the key manager 214 and used to generate individual data encryption keys to be used with the various workspaces. There can be a separate data encryption key generated for each workspace associated with a customer account. As mentioned, there may be multiple users under a customer account, such as employees of a company having an account with the resource provider. There can be a single master key for that company, and that master key can be used to generate workspace-specific data encryption keys for the workspaces provided for the associated users.

As mentioned, various virtual workspaces and workspace functionality can be accessed remotely using various workspace clients, which can include dedicated workspace applications or consoles or Web-based applications, among other such options. Accordingly, much of the workspace data accessed by users will be transmitted over public networks such as the Internet. In order to reduce the processing, memory, and other requirements of the workspace client, protocols such as PC-over-IP (PCoIP) or webRTC can be utilized that enable designated workspace servers to perform the necessary processing and then transfer image data, or pixel data, for a display corresponding to the workspace. In this way, the workspace client can function as a "dumb" terminal or diskless workstation, as the processing and storage will be performed remotely but the client will provide a display that appears to the user as if the processing is being performed by the client device. In order to provide the display information from the workspace instance in various embodiments, the PCoIP protocol can be used to compress and encrypt the workspace display data into image pixels that can be transmitted to a PCoIP-enabled client.

While the workspace data will be encrypted, it is still possible that a malicious party can obtain unauthorized access to the respective encryption key. If the party is able to obtain the data transmitted over the public network, the party can potentially decrypt the data and generate the provided display, which can enable the party to obtain confidential information provided via the display data. While confidential data used to process information to generate the display will not be transmitted, there can still be information exposed that the customer would prefer to keep confidential.

Accordingly, approaches in accordance with various embodiments can prevent at least certain types of workspace data, such as pixel data, from being transmitted over a public network such as the Internet. Conventional security measures can be applied, such as may relate to user authentication, connection establishment, and encryption of pixel traffic. In addition, the streaming of pixel traffic for a workspace can be directed to follow a path through a private customer environment, such as a customer resource environment or virtual client cloud, which can be connected to a customer data center or other customer environment. Further, the streaming can take advantage of a security gateway in at least some embodiments to avoid direct exposure of the workspace endpoint. Such an approach reduces the risk of unauthorized data access by avoiding the routing of pixel traffic through a public network, and can provide other advantages such as the ability to utilize higher capacity private or secure networks that may be associated with the resource environment.

Figure 3:
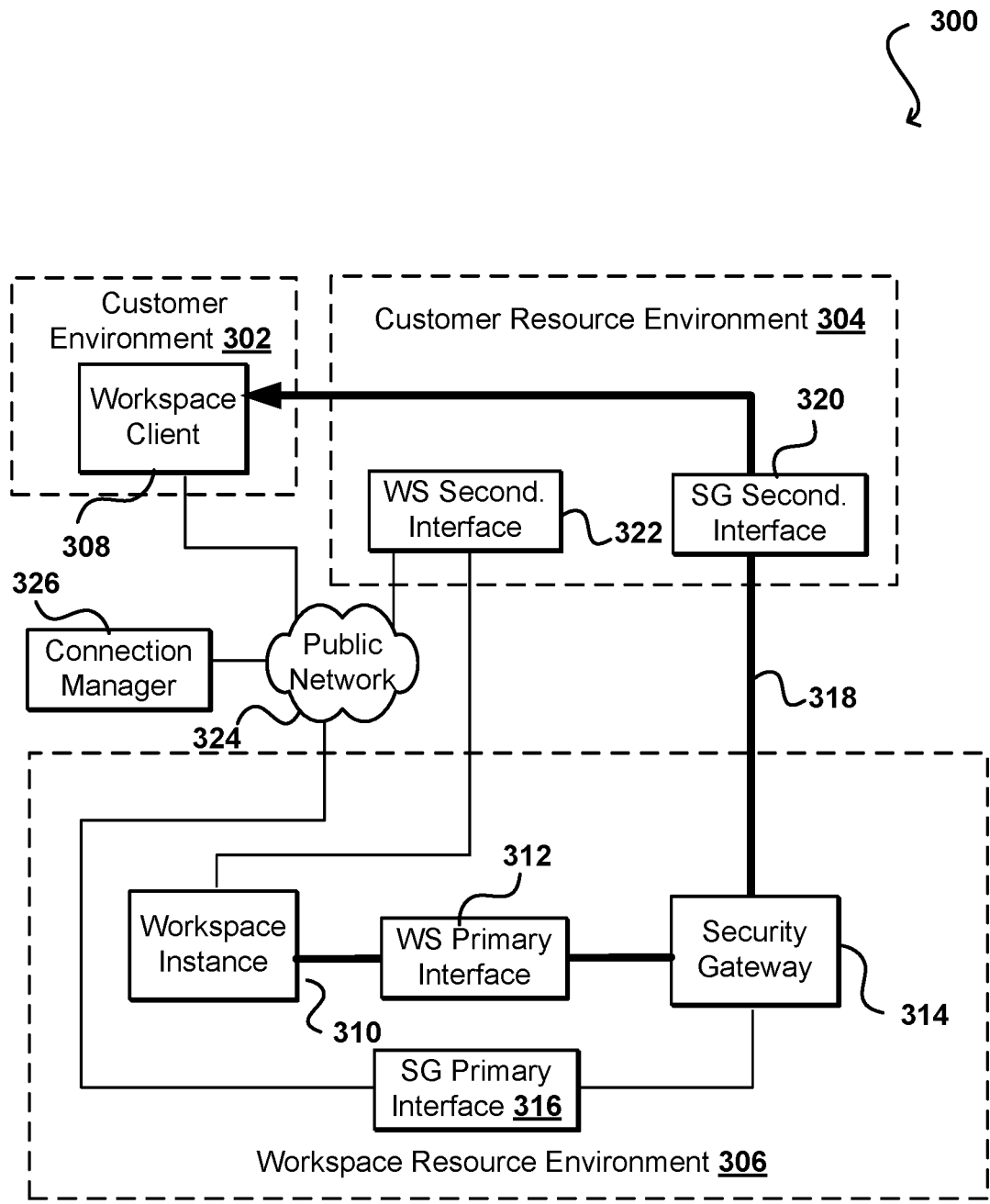
FIG. 3 illustrates an example network path configuration that can be used for virtual workspaces in accordance with various embodiments.

As an example, FIG. 3 illustrates a workspace deployment 300 that can be utilized in accordance with various embodiments. In this example, there is a customer environment 302, which might be an on-premise environment using resources provided and maintained by a customer. In this example a workspace client 308 is accessed from inside the customer environment 302, but as mentioned elsewhere herein clients can be accessed in other locations and environments as well, such as may require access over a public network 324. In this example, the customer can also utilize resources in a customer resource environment 304 including customer-allocated resources that can include dynamically allocated resources, for example, that can be maintained by the customer, a resource provider, or another such entity. The customer can also utilize resources of a workspace resource environment 306, which can include workspace-allocated resources that can be maintained, for example, by a provider offering the workspaces under a customer account. The workspace resource environment 306 will typically correspond to a set of resources provided by a resource provider or service provider, wherein shared resources are utilized to provide workspaces for multiple customers. Although the customer resource environment 304 is shown as a separate environment, it should be understood that at least part of the customer resource environment 304 can correspond to the same shared resource environment used to provide the workspace resource environment 306 in accordance with various embodiments. Further, the customer resource environment 304 can be part of, or separate from, a customer data center or other customer computing environment.

In some embodiments, a single tenancy approach can be utilized wherein a dedicated fleet of security gateway instances 314 can be allocated per customer with corresponding gateway-specific secondary or private gateway network interfaces 320 provided in the customer resource environment 304. The server gateway processes can be configured to listen specifically the attached secondary gateway interfaces 320. A set of routing rules can be configured on the workspace instances 310 to route the pixel traffic through a primary or private workspace interface 312 through a security gateway, to be directed to the corresponding secondary gateway interface 320 of the customer resource environment 304 without passing through the public network 324. In some embodiments, non-pixel data such as user requests can potentially be transmitted over the public network 324 through a secondary workspace interface 322 in the customer environment, but any pixel data generated by a workspace instance 310 in the workspace resource environment 306 will pass through a security gateway 314 and through a secondary gateway interface 320 of the customer resource environment 304. As mentioned, the security gateway 314 can be connected to the secondary gateway interfaces 320 using a socket, private network, or other such connection, that enables the pixel data to be transmitted to the workspace client 302 in the customer environment 302 through the customer resource environment 304, where there can also be a direct or secure connection between the customer environment 302 and the customer resource environment 304 that does not pass through the public network. In this example, whenever a workspace client 308 requests a security gateway instance 314 to receive a pixel stream, the private IP addresses corresponding to the attached secondary gateway interface 320 within the customer resource environment 304 can be vended, thus avoiding the routing of pixel traffic through the public network 324. Various embodiments can also support multi-tenancy by attaching multiple security interfaces from different customers to the same security gateway instances. Different security gateway processes can be initiated in sandboxed environment on the same instance, for example, and network isolation can be ensured by using network namespaces, such as Linux namespaces. The interfaces can be any appropriate network interfaces, such as elastic network interfaces (ENIs) offered through Amazon Web Services. Other virtual network interfaces can be used as well that can be attached to an instance in a resource environment, such as an Amazon Virtual Private Cloud (VPC). Such an environment can enable customers to provision a logically isolated section of a Web services cloud environment, for example, to launch Web services resources in a virtual network that the customer can at least partially define. The customer can create a public-facing subnet for the webservers and other components that should have access to a public network such as the Internet, and the backend systems, such as databases or application servers, can be placed in a private-facing subnet with no public network access. The private or secondary gateway interface 320 can enable pixel traffic to be directed to these backend systems. It should be mentioned that in a Linux environment the workspace and gateway interfaces of the workspace resource environment 306 can be configured as Eth0 and the workspace and gateway interfaces of the customer resource environment 304 can be configured as Eth1 in at least some embodiments.

In this example, the security gateway 314 can comprise a stack of security gateways with additional gateway interfaces 320 attached that are in the customer resource environment 304. Various routing rules or configuration can be put in place to cause all pixel traffic from a corresponding workspace instance 310 to be directed across a local socket and through the private secondary gateway interface 320 and the customer resource environment 304 rather than across the public network 324. In some embodiments a workspace manager can be configured to generate the appropriate routing pages such that the workspace service starts with the new gateway interface and transfers all pixel traffic through the corresponding security gateway 314. The security gateway can be configured, such as through implementation of a routing rule, such that only pixel traffic flows through the secondary gateway interfaces 320, as the security gateway can communicate with various other endpoints and services as well. The routing in at least some embodiments will be performed at the packet level. The security gateway can enforce security policies to protect data between the customer and workspace resource environments, and can inspect data transferring there between. The security gateway can perform other tasks as well, such as to perform virus scanning or implement a network firewall, among other such options. The requirement to route pixel traffic through the customer resource environment can be used to ensure that workspace clients are not being used to gain access across public networks, or from public locations, as well as to ensure that certain data never leaves a customer environment, among other such advantages.

As mentioned, the routing can be done at the packet level. In various embodiments, the workspace client 308 is expected to be in, or attached to, the client resource environment 304. Accordingly, the address range for the network and client can be determined. Each data packet can have an address destination that corresponds to the client resource environment 304. A routing rule can thus be added such that any traffic being directed to a particular range of network addresses, corresponding to the workspace client(s), will pass through the private gateway interface 320 of the customer resource environment along the secure path 318. Any workspace client connecting via the public network 324 will thus be unable to obtain the pixel data. The routing rules can be changed as appropriate to direct different types of traffic, such as may correspond to public versus private pixels, which can be designated by subsets of the IP address ranges. Further, there can be various identity management rules corresponding to the customer account which can enable the resources of the workspace resource environment to assume a customer role and communicate with the secondary gateway interface 320 in the customer resource environment 304. In some embodiments, a connection manager 326 can be used to manage data connections for various workspaces, where the connection manager 326 can be located internal, or external, to the workspace resource environment.

Figure 4:
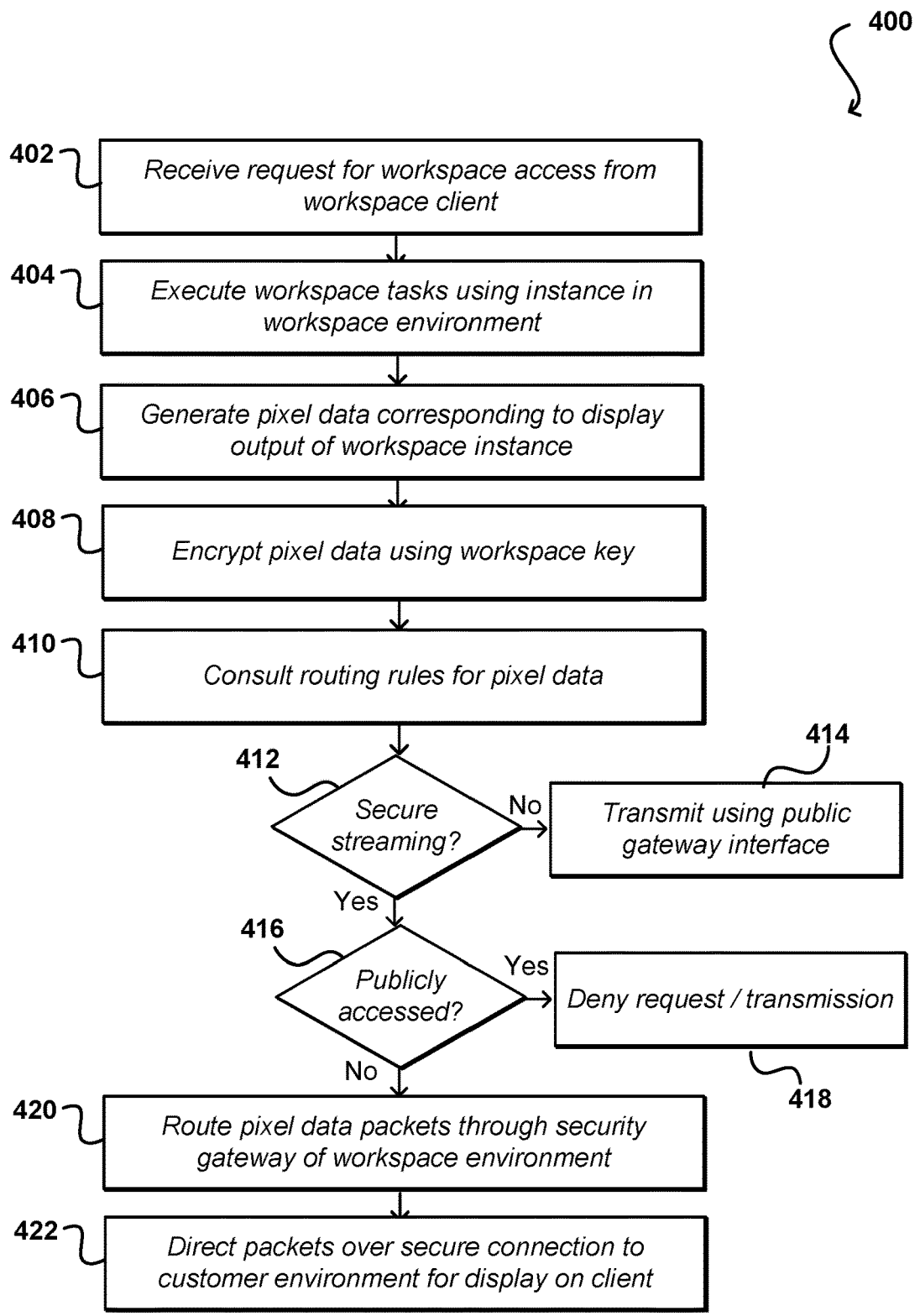
FIG. 4 illustrates an example process for routing network traffic for workspace instances that can be utilized in accordance with various embodiments.

FIG. 4 illustrates an example process 400 for routing traffic for virtual workspaces that can be utilized in accordance with various embodiments. It should be understood for the various processes described herein that additional, fewer, or alternative steps can be performed in similar or alternative orders, or in parallel, within the scope of the various embodiments unless otherwise stated. In this example, a request is received 402 for workspace access. The request can be received from a client device associated with a customer account, and may be connected using a private network connection or connected via a customer resource environment, among other such options. Assuming any necessary validation, authentication, and/or authorization is performed, as is known for accessing secured resources, the corresponding workspace tasks can be executed 404 using the appropriate workspace instance(s) and resources in the workspace resource environment. In this example, no processing is performed on the client and the client only displays pixel information provided by the workspace instance in response to the execution. The workspace instance can generate 406 pixel data corresponding to the display output that would be provided if the execution were being performed on the client device, such that from a user standpoint the user cannot determine that the processing is not being performed locally. The generation of pixel data for such purposes is discussed in more detail elsewhere herein. The pixel data can be encrypted 408 using an appropriate encryption key, as may be specific to the customer account, the workspace instance, or a data volume for the instance, among other such options.

Before transmitting the pixel data, however, the workspace instance or another appropriate component of the workspace environment can consult 410 the routing rules or table for the workspace and/or customer. This can include, for example, determining 412 whether the customer account provides for secure streaming of workspace pixel data. If not, the pixel data can be transmitted 414 using a primary or public gateway interface whereby the encrypted data passes over a public network or other such network path. If the customer account provides for secure streaming, another determination can be made 416 (if not made previously before executing the workspace tasks) as to whether the workspace request was sent over a public network, or otherwise from outside a secure customer environment. If so, the request and/or transmission of the pixel data can be denied 418. In some embodiments this determination would be made as part of the authorization process, while in other embodiments the determination may not be made or utilized until a routing table is consulted and it is determined that the data is prevented from being transmitted over a public network. If the request was received over a private or secure connection as discussed herein, the pixel data packets can be routed 420 through an appropriate security gateway of the customer environment. The packets then can be directed 422 over a secure connection, such as a dedicated secure socket, from the security gateway to the customer resource environment for display on the corresponding workspace client.

Figure 5:
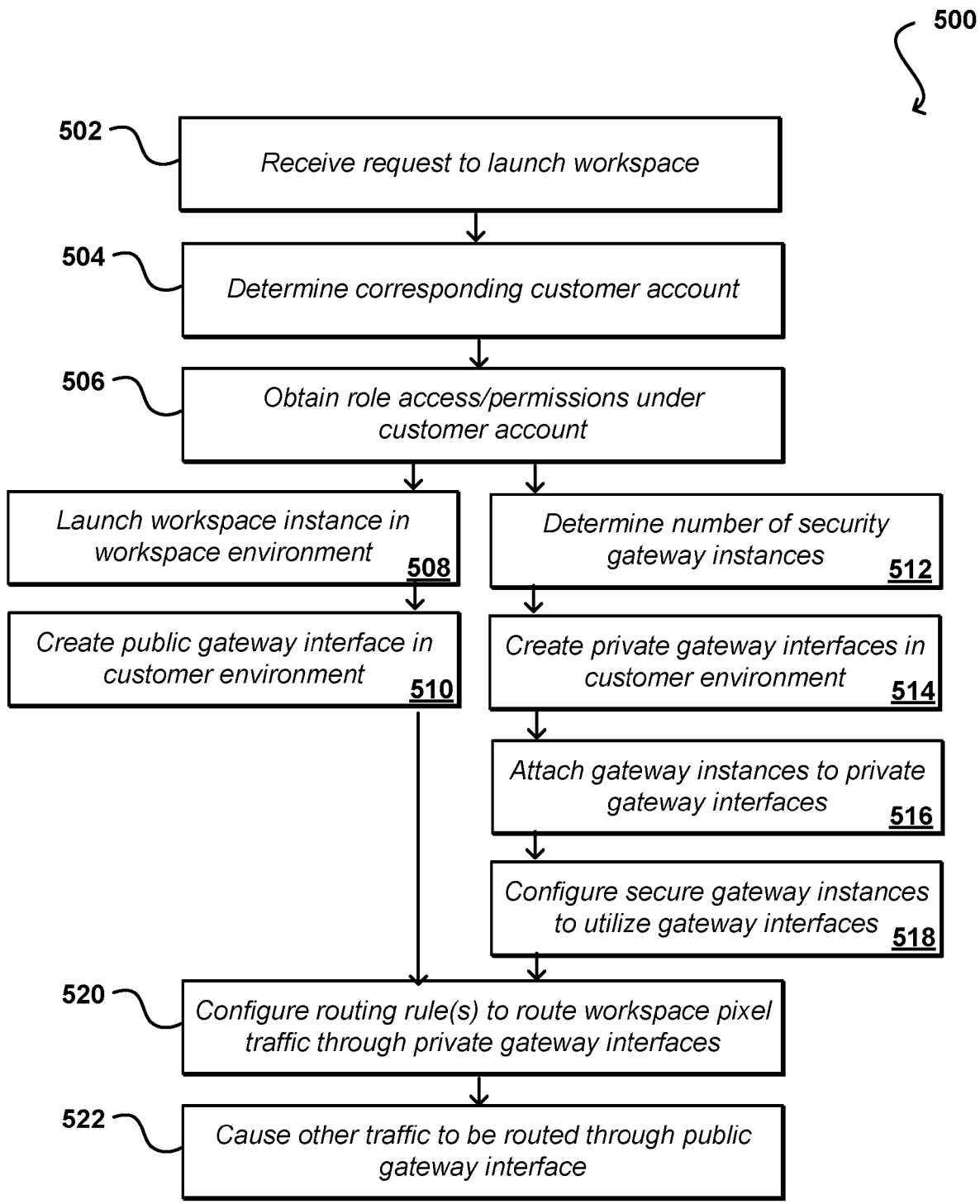
FIG. 5 illustrates an example process for configuring network traffic routing for a virtual workspace that can be utilized in accordance with various embodiments.

FIG. 5 illustrates an example process 500 for providing secure streaming for a virtual workspace that can be utilized in accordance with various embodiments. In this example a request is received 502 to launch a virtual workspace. The request can come from various sources as discussed with respect to the process of FIG. 4. In this example, the corresponding customer account can be determined 504 to ensure permission, as well as to determine that secure private streaming is to be provided for the virtual workspace. Once determined, a customer role can be obtained 506 or assumed that enables various types of access and permissions under the customer account. The role can enable workspace resources to perform actions in the customer environment. As part of the creation of the workspace, a workspace instance can be launched 508 in the workspace environment, where the workspace instance can correspond to a virtual machine instance executing on a shared server, among other such options. In addition, the customer role permissions can be used to create 510 a public gateway interface in the customer environment that can be used to receive transmission from the workspace.

Concurrently in this example, a number of security gateway instances allocated for the customer and/or workspace can be determined 512, which can function as an intermediate fleet of virtual servers. The gateway instances can be configured to receive workspace data from the workspace instance according to the relevant routing rules. Using the assumed role permissions, a private gateway interface can be created 514 in the customer environment for each identified security gateway instance. These private gateway interfaces can be, for example, virtual network interfaces that can be attached 516 to the security gateways. The individual security gateways can then be configured 518 to utilize the respective private gateway interfaces when routing network traffic. In addition, the relevant routing rule(s) can be configured 520 to route workspace pixel traffic through the security gateway interfaces of the customer resource environment, tunneled through the relevant security gateways. The routing rules can also cause 522 the other traffic, or non-pixel traffic, to be routed through the public gateway interface.

Figure 6:
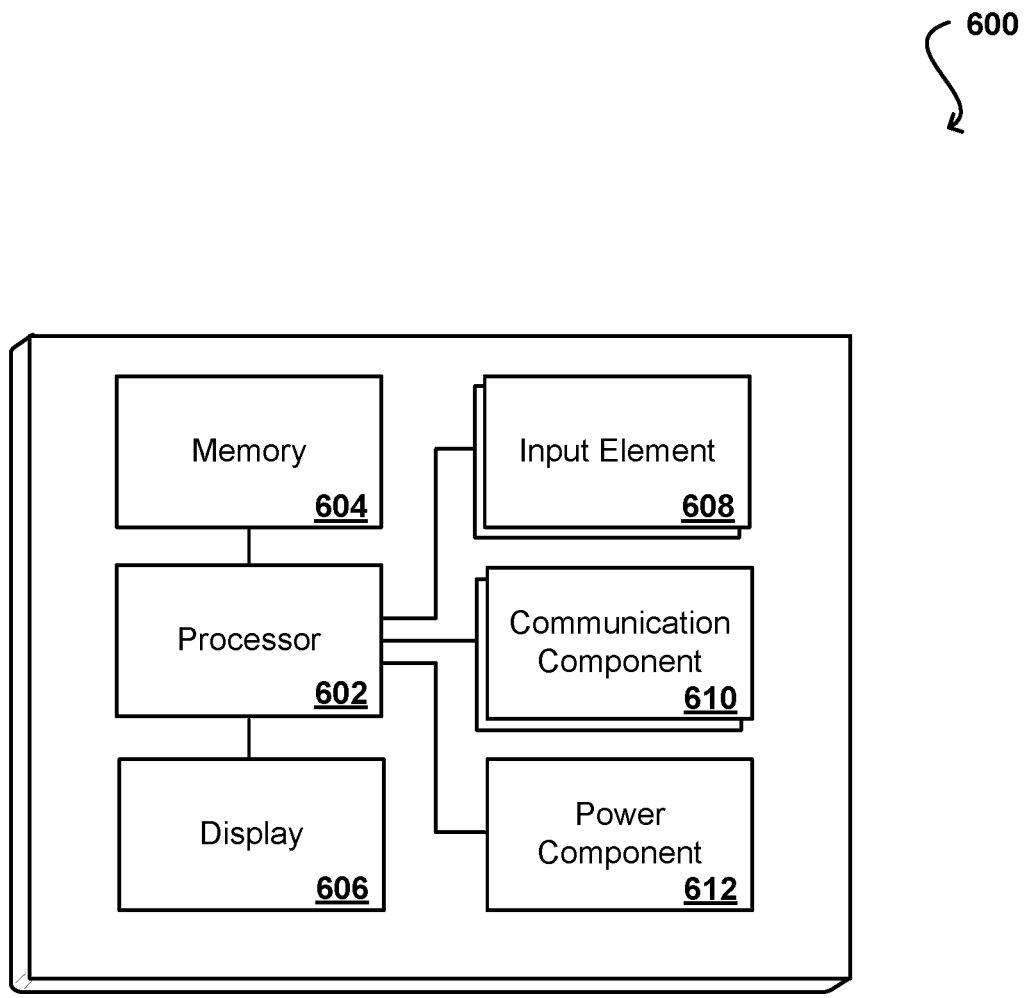
FIG. 6 illustrates components of an example computing device that can be used to perform aspects of the various embodiments.

FIG. 6 illustrates a logical arrangement of a set of general components of an example computing device that can be used to implement aspects of the various embodiments. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device may include some type of display element 606, such as a touch screen or liquid crystal display (LCD), although devices such as portable media players might convey information via other means, such as through audio speakers. In some embodiments, the computing device 600 can include one or more networking and/or communication elements 608, such as a Wi-Fi, Bluetooth, RF, wired, or wireless communication system. The device in many embodiments can communicate with a network, such as the Internet, and may be able to communicate with other such devices. In some embodiments the device can include at least one additional input component 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 612, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, from a workspace client, a request to perform a task using a virtual workspace, the virtual workspace being provided using at least one allocated computing resource of a multi-tenant environment, the at least one allocated computing resource being located in a workspace sub-network of the multi-tenant environment;
   performing the task using the virtual workspace in the workspace sub-network;
   generating, by the virtual workspace, pixel data corresponding to a workspace display resulting from performance of the task;
   determining, according to at least one routing rule for the virtual workspace, that data packets corresponding to the pixel data should be routed through a dedicated security gateway interface in a customer resource environment, the dedicated security gateway interface being securely attached to a security gateway in the workspace sub-network; and
   routing the data packets, corresponding to the pixel data, through the security gateway to the dedicated security gateway interface in the customer resource environment for display on the workspace client, wherein the pixel data is prevented from being transmitted over a public network.

2. The computer-implemented method of claim 1, further comprising:
   identifying additional data to be transmitted from the workspace sub-network to the customer environment;
   determining, according to the at least one routing rule, that the additional data is not to be routed through the dedicated security gateway interface; and
   causing the additional data to be transmitted to the customer environment over the public network or a local intranet.

3. The computer-implemented method of claim 1, further comprising:
   identifying the data packets to be routed through the dedicated security gateway interface in the customer environment by detecting one of a subset of Internet Protocol (IP) addresses, of a set of IP addresses for the customer environment, corresponding to pixel data transmissions from the workspace sub-network.

4. The computer-implemented method of claim 1, further comprising:
   generating the pixel data using the PC-over-IP (PCoIP) protocol, wherein customer data used to perform the task is not transmitted to the workspace client.

5. The computer-implemented method of claim 1, further comprising:
   determining that a communications path for the pixel data from the workspace client to the virtual workspace does not include a public network before performing the task using the virtual workspace.

6. A computer-implemented method, comprising:
   executing a virtual workspace in a workspace environment;
   generating workspace data to be provided to a workspace client associated with the virtual workspace, the workspace client operating in a customer environment;
   determining, according to at least one routing rule for the virtual workspace, that transmissions of at least a portion of the workspace data to a target destination in the customer environment are to be routed through a secure connection to the customer environment, wherein other transmissions for other target destinations in the customer environment are routed through a public network; and
   directing the workspace data through a security gateway of the workspace environment through the secure connection to a private gateway interface in the customer environment, wherein the workspace data is enabled to be propagated to the workspace client through the customer environment.

7. The computer-implemented method of claim 6, wherein generating workspace data further includes:
   generating pixel data associated with the workspace data that is to be used to render a workspace display on the workspace client.

8. The computer-implemented method of claim 6, wherein determining that transmissions to the target destination are to be routed through a secure connection further includes:
   determining that an IP address for data packets corresponding to the workspace data corresponds to a subset of customer IP addresses that are identified by the at least one routing rule.

9. The computer-implemented method of claim 6, further comprising:
   receiving a request to generate a virtual workspace in the workspace environment;
   allocating a virtual machine instance to host the virtual workspace;
   determining one or more security gateways corresponding to the virtual machine instance;
   causing a private gateway interface to be generated in the customer environment for each of the security gateways corresponding to the virtual machine instance; and securely attaching each of the private gateway interfaces to a respective security gateway, wherein the workspace data is enabled to be directed through the security gateway to the private gateway interface without transmission over a public network.

10. The computer-implemented method of claim 9, further comprising:
   determining identity information for a customer account; and
   assuming a customer role under the customer account, wherein the assuming of the customer role enables a workspace manager to cause the gateway interface to be generated in the customer environment.

11. The computer-implemented method of claim 9, further comprising:
   generating a public gateway interface enabling the alternative transmissions to be routed through the public network.

12. The computer-implemented method of claim 9, further comprising:
   generating the at least one routing rule to cause the transmissions to the target destination to be routed through the private gateway interface in the customer environment.

13. The computer-implemented method of claim 6, further comprising:
   determining that a communications path from the workspace client to the virtual workspace does not include a public network before generating the workspace data.

14. The computer-implemented method of claim 6, further comprising:
   encrypting the workspace data before directing the workspace data through the security gateway.

15. A system, comprising:
   at least one processor; and
   memory including instructions that, when executed by the at least one processor, cause the system to:
   execute a virtual desktop in a resource environment;
   generate desktop data to be provided to a desktop client associated with the virtual desktop, the desktop client operating outside of the resource environment;
   determine, according to at least one routing rule for the virtual desktop, that transmissions of at least a portion of the desktop data to a target destination are to be routed through a secure connection to a customer environment, wherein other transmissions for other target destinations in the customer environment are routed through a public network; and
   direct the desktop data through a security gateway of the resource environment through the secure connection to a private gateway interface in the customer environment, wherein the desktop data is enabled to be propagated to the desktop client.

16. The system of claim 15, wherein the instructions when executed further cause the system to:
   generate pixel data corresponding to the desktop data that is to be used to render a desktop display on the desktop client.

17. The system of claim 15, wherein the instructions when executed further cause the system to:
   determine that an IP address for data packets corresponding to the desktop data corresponds to a subset of customer IP addresses that are identified by the at least one routing rule.

18. The system of claim 15, wherein the instructions when executed further cause the system to:
   receive a request to generate a virtual desktop in the resource environment;
   allocate a virtual machine instance to host the virtual desktop;
   determine one or more security gateways corresponding to the virtual machine instance;
   cause a private gateway interface to be generated in the customer environment for each of the security gateways corresponding to the virtual machine instance; and
   securely attach each of the private gateway interfaces to a respective security gateway, wherein the desktop data is enabled to be directed through the security gateway to the private gateway interface without transmission over a public network.

19. The system of claim 18, wherein the instructions when executed further cause the system to:
   determine identity information for a customer account associated with the virtual instance; and
   assume a customer role under the customer account, wherein the assuming of the customer role enables a desktop manager to cause the gateway interface to be generated in the customer environment.

20. The system of claim 18, wherein the instructions when executed further cause the system to:
   generate a public gateway interface enabling the alternative transmissions to be routed through the public network to the virtual desktop.

* * * * *